United States Patent
Boonekamp et al.

(10) Patent No.: US 8,251,529 B2
(45) Date of Patent: Aug. 28, 2012

(54) THIN ILLUMINATION DEVICE, DISPLAY DEVICE AND LUMINARY DEVICE

(75) Inventors: Erik Boonekamp, Eindhoven (NL); Theodoor Cornelis Treurniet, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 362 days.

(21) Appl. No.: 12/444,705

(22) PCT Filed: Oct. 4, 2007

(86) PCT No.: PCT/IB2007/054029
§ 371 (c)(1),
(2), (4) Date: Apr. 8, 2009

(87) PCT Pub. No.: WO2008/044170
PCT Pub. Date: Apr. 17, 2008

(65) Prior Publication Data
US 2010/0033954 A1 Feb. 11, 2010

(30) Foreign Application Priority Data
Oct. 10, 2006 (EP) .................................. 06122037

(51) Int. Cl.
*F21V 7/00* (2006.01)
(52) U.S. Cl. .......... 362/97.1; 362/247; 362/300; 362/30
(58) Field of Classification Search .................. 362/30, 362/614, 330, 84, 97.1–97.4, 612, 560, 153, 362/311.02, 228, 249.02, 247, 245, 241, 362/243, 298, 300, 301
See application file for complete search history.

(56) References Cited

U.S. PATENT DOCUMENTS

| | | | |
|---|---|---|---|
| 4,975,814 A * | 12/1990 | Schairer | 362/240 |
| 5,367,441 A | 11/1994 | Wustlich | |
| 5,477,422 A | 12/1995 | Hooker et al. | |
| 6,234,648 B1 * | 5/2001 | Borner et al. | 362/235 |
| 6,856,087 B2 | 2/2005 | Lin et al. | |
| 7,086,768 B2 * | 8/2006 | Suwa et al. | 362/555 |
| 7,658,504 B2 * | 2/2010 | Moriyasu et al. | 362/97.3 |
| 2002/0057567 A1 | 5/2002 | Chen | |
| 2005/0265029 A1 | 12/2005 | Epstein et al. | |
| 2006/0087866 A1 | 4/2006 | Ng et al. | |

FOREIGN PATENT DOCUMENTS

| | | |
|---|---|---|
| DE | 19845229 C1 | 10/1998 |
| EP | 1564478 A1 | 8/2005 |
| EP | 1650730 A1 | 4/2006 |
| GB | 2365112 A | 2/2002 |
| JP | 01205480 A | 8/1989 |
| JP | 11266035 A | 9/1999 |

(Continued)

*Primary Examiner* — Bao Q Truong
(74) *Attorney, Agent, or Firm* — John F. Salazar; Mark L. Beloborodov

(57) ABSTRACT

The invention relates to a thin illumination device (1, 10, 20, 30, 40, 50, 60). The invention also relates to a display device and a luminary device comprising such a thin illumination device. The thin illumination device comprises a translucent plate (2, 23, 31, 41, 51, 66, 73) provided with an array of light-emitting diodes (LEDs) (3, 32, 47, 61, 75) connected by an electric conducting pattern, and a reflector (4, 20, 22, 43, 53, 62, 74) arranged on a first side of the plate at a distance from the plate. Such a construction can be made thinner and works more efficiently than a conventional LED thin-film illumination device.

11 Claims, 4 Drawing Sheets

FOREIGN PATENT DOCUMENTS

| | | |
|---|---|---|
| JP | 2002231037 A | 8/2002 |
| WO | 8905524 A1 | 6/1989 |
| WO | WO8905524 * | 6/1989 |
| WO | 2005083317 A1 | 9/2005 |

* cited by examiner

THIN ILLUMINATION DEVICE, DISPLAY DEVICE AND LUMINARY DEVICE

This application is a national stage application under 35 U.S.C. §371 of International Application No. PCT/IB2007/054029 filed on Oct. 4, 2007, which claims priority to European Application No. 06122037.2, filed on Oct. 10, 2006, incorporated herein by reference.

FIELD OF THE INVENTION

The invention relates to a thin illumination device. The invention also relates to a display device and a luminary device comprising such a thin illumination device.

BACKGROUND OF THE INVENTION

Light-emitting diodes (LEDs) can be used in thin illumination devices that provide backlighting, for instance, in liquid crystal displays (LCD) and luminaires. Thin illumination devices typically comprise an array of LEDs positioned behind objects to be backlit, such as liquid crystal plates, advertising screens or decorative tiles. A disadvantage is that LEDs emit light from a small surface area; hence the device must have a relatively thick structure in order to achieve an acceptable color and luminance uniformity. Conventional LED backlighting devices usually need more than 10 mm and additional diffuser layers in order to obtain a sufficiently uniform luminance.

OBJECT AND SUMMARY OF THE INVENTION

It is an object of the invention to provide an improved thin illumination device.

The invention provides a thin illumination device comprising a translucent plate provided with an array of light-emitting diodes (LEDs) connected by an electric conducting pattern, and a reflector arranged on a first side of the plate at a distance from the plate, wherein the array of LEDs is arranged to emit light which is substantially directed towards the reflector, and the reflector is arranged to reflect light from the LEDs through the translucent plate. As compared with a conventional LED backlight, wherein the LEDs are located on the reflector, such a thin illumination device results in a more diffuse light emitted through the translucent plate. Effectively, the shortest possible optical path of the light emitted by the LED array is doubled in comparison with a configuration in which the LEDs are located on the reflector. The LED may be any type of light-emitting diode or comparable light source, for instance, RGB LEDs or a mix of different LED types, in particular white LEDs and phosphor-converted LEDs. If differently colored LEDs are used, the device according to the invention also improves color mixing, leading to a uniform spectrum emitted by the device. Another advantageous effect is that the invention minimizes binning effects of the LEDs. Binning is the effect that leads to a decreased luminance uniformity due to slight differences in flux and/or color of individual LEDs within a batch of similar LEDs. The translucent plate is preferably made of a translucent glass or resin or polymer material. The LEDs may be arranged on either side of the translucent plate or may be integrated in the plate. The electric conducting pattern is arranged to power the LEDs and comprises connections to the LEDs and an external electric power source. The electric conducting pattern may be provided with an anti-reflective coating in order to improve the optical efficiency of the system. The reflector is arranged to reflect light from the LEDs through the translucent plate. The array of LEDs arranged to emit light which is substantially directed towards the reflector may comprise optical elements designed to control the direction of the light. The LEDs may be provided with a transparent package in order to minimize shadows on the side of the translucent panel opposite the reflector, in which, for instance, an LCD screen may be positioned. Depending on its application, the illumination device typically contains 100 to 1000 LEDs per $m^2$, which is strongly dependent on the light output of the LEDs and the type of application. A LED array wherein the LEDs are positioned in an essentially square configuration is the easiest to produce. In a square configuration, four adjacent LEDs form a square. However, a better light uniformity is obtainable if a hexagonal configuration is used. In a hexagonal configuration, six adjacent LEDs form a hexagon. The reflector may be made of any light-reflecting material, depending on the preferred application. The invention is especially suitable for low-power LEDs (typically lower than 0.5 W per LED), dissipating only a small amount of power per LED. Placing the LEDs on glass or resin is therefore efficient enough without the use of bulky heatsinks.

The reflector is preferably substantially parallel to the translucent plate. A good luminance uniformity is easily obtainable with this configuration. Substantially parallel refers to the overall configuration of the device, whereas the reflector and/or the plate do not necessarily have to be perfectly flat or follow the same curvature at each position.

In a preferred embodiment, the reflector is a diffusing reflector. An improved uniformity of luminance is thus obtained. A diffusing reflector is typically provided with a light-diffusing surface.

In a more preferred embodiment, the diffusing reflector comprises diffusing elements. Such a diffuse reflector allows better fine-tuning of the uniformity of luminance. Useful diffusing elements are chosen in dependence on the application, and may have various forms such as pyramidal, conical and (hemi-)spherical forms protruding from the reflector surface.

It is advantageous if the electric conducting pattern comprises a translucent electric conducting material. Such translucent patterns improve the optical efficiency of the device. Examples of useful conducting materials comprise indium tin oxide (ITO) and fluor-doped tin oxide ($SnO_2$:F).

Alternatively, it is advantageous if the electric conducting pattern comprises a metal wire. Metal wires may be loose wires or formed as patterns in thin layers, for instance, by depositing copper or aluminum, and generally have a better conductivity and less power dissipation than most translucent conducting materials. The form and size of the wires can be optimized to minimize interference with the luminance. The metal wire can be printed on the glass or made by means of standard lithography, but also a wire net can be used in which the wires connecting with the LED are only partially connected to the plate.

In a preferred embodiment, the distance between the reflector and the translucent plate is between 2 and 10 mm. Such a distance yields a compact device which has a sufficient luminance uniformity of the light emitted through the plate, in particular for LCD backlighting applications.

The translucent plate is preferably provided with a reflecting dot pattern. The reflecting dots further improve the luminance uniformity. The reflecting dots are typically made of a white reflecting material and may be applied to either side of the translucent plate, or on both sides.

In a preferred embodiment, the reflecting dots in the pattern have a relatively high density near a LED and a relatively low density remote from the LED. It is thus relatively easy to achieve an even more effective diffusion of light. This renders it possible to realize an even smaller distance between the plate and the reflector while still achieving a good luminance uniformity.

In a preferred embodiment, the array of LEDs comprises blue LEDs and/or UV LEDs and the reflector comprises a fluorescent material. This configuration allows fine-tuning of the color spectrum of light emitted by the device. The fluorescent material is typically a fluorescent phosphor, such as YAG:Ce, which may be integrated or coated onto the reflector, preferably in the form of a printed pattern. The preferred wavelengths emitted by the LEDs and the fluorescent material are preferably selected to complement each other. Blue LEDs emit light primarily at wavelengths which are shorter than 500 nm, while UV LEDs emit light at wavelengths which are shorter than 380 nm. The phosphor absorbs the blue and/or UV light, and emits light at longer wavelengths.

Mixtures of phosphors emitting at different wavelengths are preferably used to obtain an optimal spectrum for a certain application. Fine-tuning the spectrum of the illumination device can be done by balancing the amount of blue light scattered at the reflector and the amount of light generated by excitation of the phosphors on the reflector. Also a mixture of white and luminescent pigments can be used to tune the emitted color of the device, for instance, to obtain white light.

It is advantageous if at least one fluorescent light tube is arranged between the translucent plate and the reflector. As the light from the device is a mix of light from the LEDs and the fluorescent light tube, it is possible to optimize the spectrum emitted by the device. Typical conventional fluorescent light tubes used in backlighting are of the CCFL, EEFL and HCFL types. The light tubes and LEDs are preferably arranged in an alternating pattern with respect to each other.

It is preferred if the translucent plate is provided with an optically active front layer. This leads to an even better luminance uniformity. The optically active front layer may comprise, for instance, a diffuser plate, a diffuser film or a filter. Examples of effective optically active front layers are described in Philips' patent application WO 2005/083317.

In a preferred embodiment, an optically active front layer is integrated with the translucent plate. A very compact device is thus made possible.

Alternatively, an optically active front layer is positioned at a distance from the translucent plate on a second side of the translucent plate opposite the reflector. The distance from the optically active front layer to the translucent plate is preferably smaller than the distance from the reflector to the translucent plate.

In a preferred embodiment, the optically active front layer and the plate enclose a space that is in open communication with the outer environment. The space thus forms an air channel through which heat can be dissipated away from the device during service, thereby lowering electric resistance and power consumption.

In a preferred embodiment, the translucent plate is a flexible polymer film. Great freedom of design is thus possible. The reflector may also be flexible or may be arranged as a support for the flexible polymer film. Such an embodiment is very useful in various applications as a backlighting device, in particular in luminary applications such as billboards, wall cladding and lighting in floor tiles.

The invention further provides a display device comprising a thin illumination device as defined in the claims, used as a backlight. A display device according to the invention is thinner and more efficient than known LED-based displays with a comparable light uniformity and color mixing.

The invention also provides a luminary device comprising a thin illumination device according to the invention. Such a luminary device according to the invention is thinner than a known LED-based display with a comparable light uniformity. Wall cladding and use under translucent floor tiles are typical luminary applications.

The invention will now be elucidated by way of non-limiting example with reference to the following embodiments. The technical measures shown in the embodiments may be combined to achieve cumulative effects, which may be advantageous in certain applications.

DESCRIPTION OF EMBODIMENTS

Figure 1A:
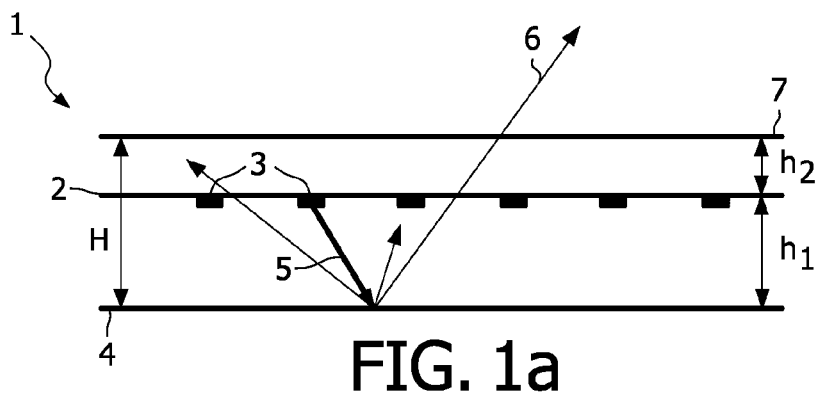
FIGS. 1a, 1b and 1c show a first preferred embodiment of the invention.

FIG. 1a shows a thin illumination device 1 according to the invention. It comprises a thin glass plate 2 on which a LED array 3 is arranged. The LEDs 3 are directed towards a diffusing reflector 4 positioned parallel to the glass plate 2, such that light 5 emitted by a LED 3 is reflected back as diffused light 6 through the glass plate 2. A very effective diffusion of light is thus possible while using a relatively small distance h1 between the glass plate 2 and the reflector 4, resulting in a relatively thin illumination device 1 with a uniform luminance distribution. The LEDs, if used in known systems, would be attached on the reflector 4; in such a case, a larger thickness of the complete system would be needed to achieve a similar level of light diffusion at the position of the glass plate 2. An additional optical stack 7, comprising, for instance, a diffuser layer, a brightness-enhancing layer and optical filters can be placed in front of the glass plate 2. The device 1 may be placed behind, for instance, an LCD screen as a backlight. Alternatively, the LED array 3 may be arranged at the side of the glass plate 2 facing the optical stack 7, or it may be integrated in the glass plate, wherein the LEDs 3 can still be directed towards the reflector 4 through the glass plate.

Both the space between the glass plate 2 and the reflector 4 (thickness h1) and the space between the optical stack 7 and the glass plate 2 (thickness h2) may be in open air contact with the environment, thus allowing air cooling by convection for the LEDs 3 and the related electric circuitry during use. The distance between reflector 4 and glass plate 2 (h1) will be preferably larger than the distance between optical stack 7 and glass plate 2 (h2). It is even possible to integrate the optical stack with the glass plate, reducing the distance h2 effectively to zero. For a given total thickness H (h1+h2) of the system, the best configuration is a location of the translucent plate 2 with LEDs 3 at the minimal distance below the front optical stack 7, such that no shadows in the reflected light from the reflector 4 due to the LEDs 3 or other light-blocking objects on the plate are formed on the optical stack 7.

Figure 1B:
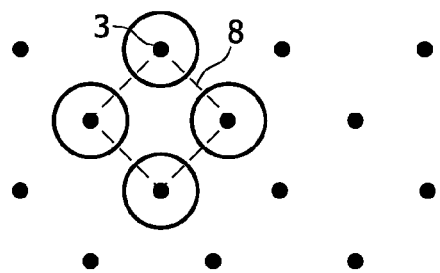

FIG. 1b shows a square pattern of the LED array 3, wherein four adjacent LEDs form a square 8. Such a pattern is relatively easy to produce. Electric power for the LED array is provided by a transparent conductor pattern (not shown), but metal patterns applied to the glass plate can also be applied.

Figure 1C:
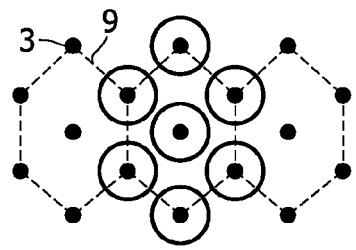

As an alternative to the square pattern of FIG. 1b, FIG. 1c shows a hexagonal pattern of the LED array 3, wherein adjacent LEDs are more tightly packed than in a square form and offer a better uniform luminance coverage of the area (circles 9). Such a hexagonal pattern 9 provides a relatively efficient distribution of light sources. Electric power for the LED array is provided by a transparent conductor pattern (not shown).

Figure 2:
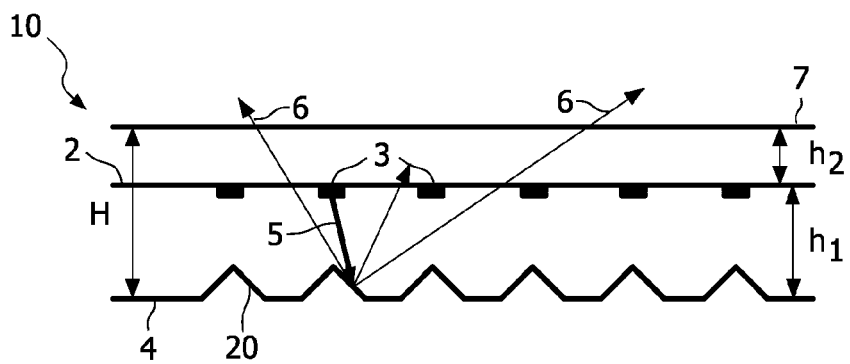
FIG. 2 shows a second preferred embodiment of the invention.

FIG. 2 shows a second preferred embodiment of a thin illumination device 10 according to the invention, wherein the reflector is provided with shaped reflecting elements 20, allowing an even better diffusion of light.

Figure 3:
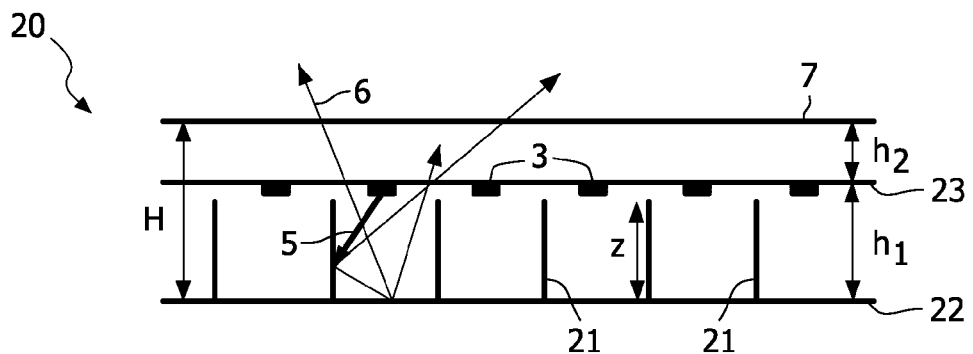
FIG. 3 shows a third preferred embodiment of the invention.

FIG. 3 shows a third preferred embodiment of a thin illumination device 20 according to the invention, wherein the reflecting elements are orthogonal reflecting walls 21 directed from the reflector 22 towards the glass plate 23, achieving a good luminance uniformity as well as a good color mixing when colored LEDs are used. The segments defined by the walls 21 can be illuminated separately, which is favorable in a scanning backlight to reduce motion blur in dynamic images.

Figure 4A:
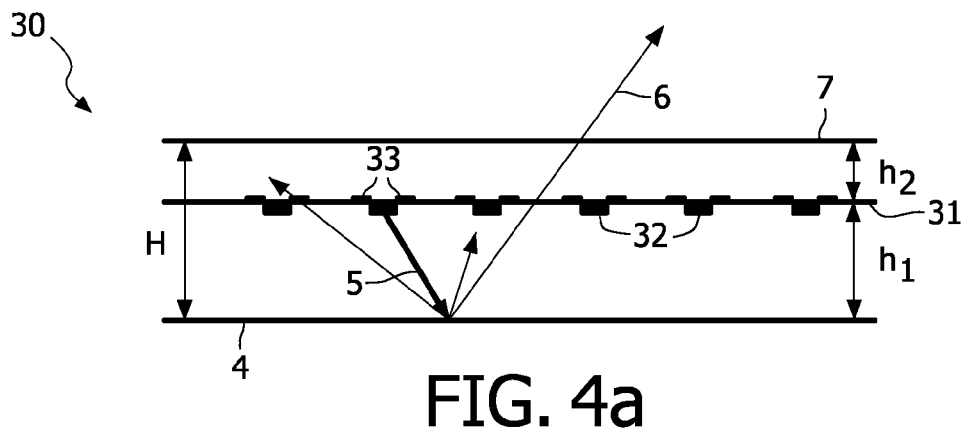
FIGS. 4a and 4b show a fourth preferred embodiment of the invention.
Figure 4B:
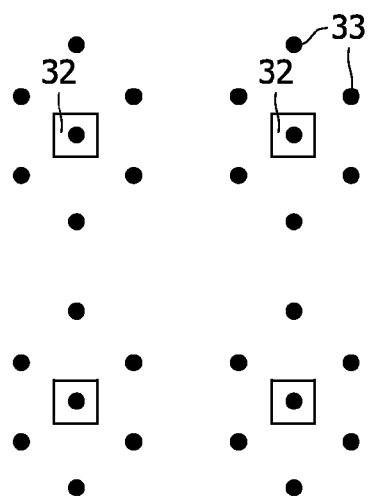

FIG. 4a shows a fourth preferred embodiment of a thin illumination device 30 according the invention, wherein a pattern of reflecting dots 33 applied to the glass plate 31 is used to improve the light uniformity. The concentration of dots 33 is larger near the LEDs 32, as is shown in a top view in FIG. 4b. The larger concentration of dots 33 near the LEDs 32 leads to a better luminance uniformity than an evenly divided dot pattern. The pattern of the embodiment shown in FIG. 4b is an example, and alternative patterns may be used to a similar effect.

Figure 5:
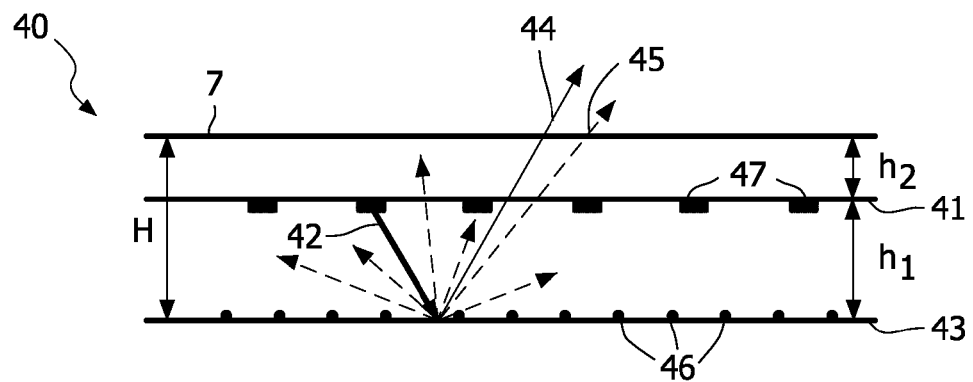
FIG. 5 shows a fifth preferred embodiment of the invention.

FIG. 5 shows a fifth preferred embodiment of a thin illumination device 40 according to the invention. The LEDs 47 positioned on the translucent plate 41 direct their LED light 42 towards the reflector 43. The reflector is coated with a fluorescent phosphor dot pattern 46 that may have a configuration similar to the pattern of the reflective dots on the glass plate in FIG. 4b. Part of the light from the LEDs 47 is reflected and diffused by the reflector 43 through the glass plate 41, denoted by the solid-line arrow 44. Another part of the LED light 42 is absorbed by the phosphor dots 46 and re-emitted as light of a different wavelength, denoted by the broken-line arrows 45. A mix of LED light and fluorescent light is thus obtained, allowing fine-tuning of the spectrum of light emitted by the device as a whole. LEDs 40 emitting mainly blue light (wavelength shorter than 500 nm) are preferably used for this application, wherein the phosphor is selected to emit mainly towards the red part of the spectrum (wavelength longer than 600 nm). For instance, YAG:Ce emits in the green-yellow range. In combination with blue light from the LEDs, this yields white as the emitted spectrum from the device as a whole.

Figure 6:
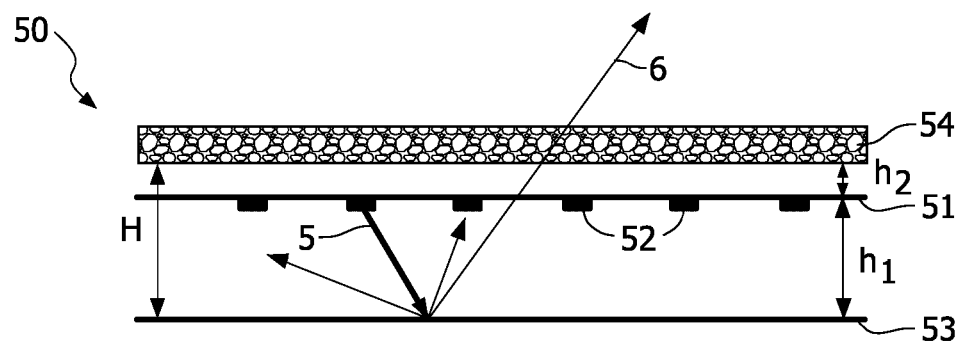
FIG. 6 shows a sixth preferred embodiment of the invention.

FIG. 6 shows a sixth preferred embodiment of a thin illumination device 50 according to the invention. In this embodiment, a translucent decorative tile 54, typically made of a ceramic material or a resin material, is positioned adjacent to the glass plate 51 provided with LEDs 52, on the side of the glass plate opposite the reflector 53. As the light from the LEDs 52 is emitted through the decorative tile 50 indirectly via the reflector 53, a good uniformity of luminance is achieved while the device H (h1+h2) can have a relatively small thickness. A device using side-emitting LEDs placed on the reflector 53 would have less uniformity of luminance at a comparable thickness.

Figure 7:
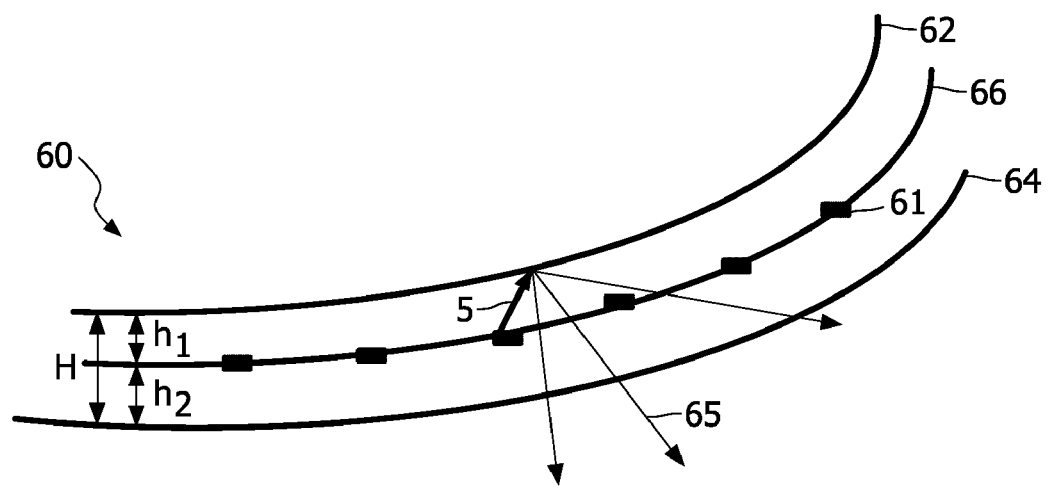
FIG. 7 shows a seventh preferred embodiment of the invention.

FIG. 7 shows a seventh preferred embodiment of a thin illumination device 60 according to the invention, wherein a flexible polymer foil 66 with integrated LEDs 61 and circuitry (not shown) is bent in a desired form. The shape of the reflector 62 follows the curvature of the polymer foil 66. An optical stack 64, which, dependent on its application, further diffuses and filters the light 65 emitted by the device, is positioned on the viewer side of the polymer foil 66. This embodiment allows great freedom of design, for instance, in wall cladding.

Figure 8:
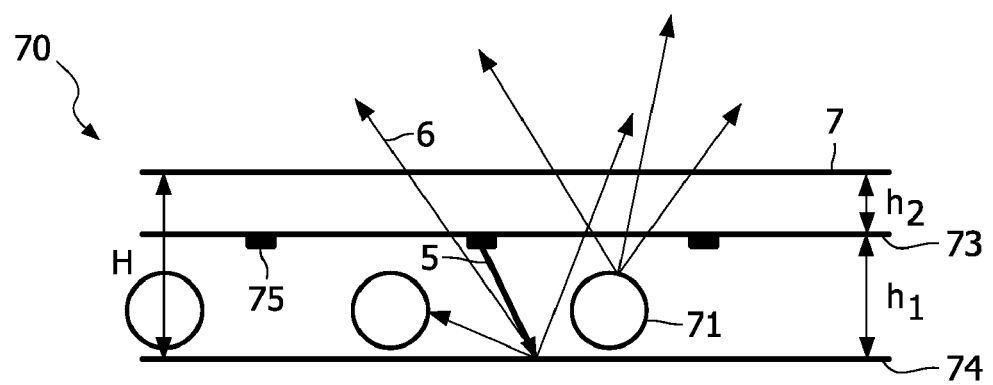
FIG. 8 shows an eighth preferred embodiment of the invention.

FIG. 8 shows an eighth preferred embodiment of a thin illumination device 70 according to the invention, wherein LEDs 75 and conventional tubular fluorescent lamps 71 are integrated in a single device 70. The fluorescent lamps 71 are positioned between the glass plate 73 provided with LEDs 75 and the reflector 74. The spectrum emitted by the LEDs 75 and the fluorescent lamps 71 are preferably selected to complement each other, dependent on their application. By combining LEDs 75 and fluorescent lamps 71, it becomes relatively easy to obtain a desired spectrum, which can be further optimized by an optical stack 7. Typical conventional fluorescent lamps 71 used, for instance, in backlighting are CCFL and EEFL lamps.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A thin illumination device comprising:
an array of light-emitting diodes interconnected via a electrically conducting pattern;
a translucent plate, and
a reflector arranged facing a first side of said translucent plate at a predetermined distance from said plate,
wherein said array of light emitting diodes is arranged on said first side of said translucent plate to emit light which is substantially directed towards said reflector;
said reflector is positioned to reflect light from said light emitting diodes through said translucent plate;
said electrically conducting pattern including a translucent electric conducting material;
said reflector being substantially parallel to said translucent plate;
said translucent plate including a reflecting dot pattern on a second side opposite said first side;
said reflecting dot pattern having a relatively high density near said light emitting diodes and a relatively low density remote from said light emitting diodes.

2. A thin illumination device according to claim 1, wherein the reflector is a diffusing reflector, comprising one or more diffusing elements.

3. A thin illumination device according to claim 1, wherein the electric conducting pattern includes a metal wire.

4. A thin illumination device according to claim 1, wherein the distance between the reflector and the translucent plate is between 2 and 10 mm.

5. A thin illumination device according to claim 1, wherein the array of LEDs comprises blue LEDs and/or UV LEDs, and the reflector comprises a fluorescent material.

6. A thin illumination device according to claim 1, wherein at least one fluorescent light tube is arranged between the translucent plate and the reflector.

7. A thin illumination device according to claim 1, wherein the translucent plate comprises an optically active front layer.

8. A thin illumination device according to claim 7, wherein the optically active front layer is integrated with the translucent plate.

9. A thin illumination device according to claim 8, wherein the optically active front layer is positioned at a distance from the translucent plate on said second side of the translucent plate opposite the reflector.

10. A thin illumination device according to claim 1, wherein the translucent plate is a flexible polymer film.

11. A thin illumination device comprising:
an array of light-emitting diodes interconnected through an electrically conducting connector on a first side of a translucent plate,
a reflector arranged facing said first side of said translucent plate at a predetermined distance from said plate,
an optical stack positioned away from said array of light emitting diodes on an opposite second side of said translucent plate from said reflector;
at least one fluorescent light tube arranged between said first side of said translucent plate and said reflector;
said array of light emitting diodes being arranged to emit light substantially directed towards said reflector, said reflector positioned to reflect light from said light emitting diodes through said translucent plate;
said reflector being substantially parallel to said translucent plate;
said translucent plate including a reflecting dot pattern on said second side of said translucent plate and positioned opposite said reflector;
said reflecting dot pattern having a relatively high density near said light emitting diodes and a relatively low density remote from said light emitting diodes;
said array light emitting diodes including having varying wavelengths, and
said reflector including a fluorescent material.

* * * * *